(12) United States Patent
Jones

(10) Patent No.: US 7,236,094 B2
(45) Date of Patent: Jun. 26, 2007

(54) DRUG AND ALCOHOL SENSOR SAFETY SYSTEM AND METHODS

(75) Inventor: Micheal P. Jones, Phoenix City, AL (US)

(73) Assignee: Kathryn Jackson, Fortson, GA (US)

( * ) Notice: Subject to any disclaimer, the term of this patent is extended or adjusted under 35 U.S.C. 154(b) by 132 days.

(21) Appl. No.: 10/983,946

(22) Filed: Nov. 8, 2004

(65) Prior Publication Data
US 2005/0099310 A1 May 12, 2005

Related U.S. Application Data

(60) Provisional application No. 60/519,466, filed on Nov. 12, 2003.

(51) Int. Cl.
*G08B 23/00* (2006.01)
(52) U.S. Cl. .......... 340/576; 340/573.1; 340/438; 340/632; 436/900; 436/901; 180/272
(58) Field of Classification Search ............ 340/576, 340/573.1, 438, 632; 436/900, 901; 180/272
See application file for complete search history.

(56) References Cited

U.S. PATENT DOCUMENTS

| 4,592,443 | A | * | 6/1986 | Simon | 180/272 |
|---|---|---|---|---|---|
| 4,613,845 | A | | 9/1986 | Du Bois | 340/52 |
| 4,723,625 | A | | 2/1988 | Komlos | 180/272 |
| 5,020,628 | A | | 6/1991 | Bigliardi et al. | 180/272 |
| D320,169 | S | | 9/1991 | Bigliardi et al. | D10/81 |
| 5,426,415 | A | | 6/1995 | Prachar et al. | 340/576 |
| 5,969,615 | A | * | 10/1999 | Ivey et al. | 340/576 |
| 6,886,653 | B1 | * | 5/2005 | Bellehumeur | 180/272 |
| 6,956,484 | B2 | * | 10/2005 | Crespo | 340/576 |

* cited by examiner

*Primary Examiner*—Jeffery Hofsass
*Assistant Examiner*—Samuel J. Walk
(74) *Attorney, Agent, or Firm*—James W. Kayden; Thomas, Kayden, Horstemeyer & Risley, LLP

(57) ABSTRACT

A method for providing an automotive safety system, comprising the steps of: collecting and analyzing data from the proximity of a potential driver, determining whether the potential driver is under the influence of intoxicating substances, and disabling an automotive ignition system if the potential driver is determined to be under the influence of intoxicating substances.

17 Claims, 5 Drawing Sheets

DRUG AND ALCOHOL SENSOR SAFETY SYSTEM AND METHODS

CROSS-REFERENCE TO RELATED APPLICATION

This application claims priority to copending U.S. provisional application entitled, "Drug and Alcohol Sensor Safety System and Methods" having Ser. No. 60/519,466, filed Nov. 12, 2003, which is entirely incorporated herein by reference.

TECHNICAL FIELD

The present disclosure is generally related to automotive safety and, more particularly, is related to a system and method for improving automotive safety by sensing drugs and alcohol on a prospective driver.

BACKGROUND

Many resources are committed each year to reducing and preventing the losses associated with DUI/DWI including stiff criminal penalties, zero-tolerance enforcement practices, significant financial liabilities, social stigmatism, and education. Although these measures have proven somewhat effective in varying degrees, society still experiences significant losses associated with DUI/DWI. One device designed to prevent an impaired person from operating a vehicle requires the input of numerical data in a keypad in a short amount of time before starting the vehicle. The effectiveness of this device is limited in that some people can perform tasks of this nature even while intoxicated. Additionally, the task could be performed by a sober party on behalf of an intoxicated driver, hence effectively bypassing the system.

Thus, a heretofore-unaddressed need exists in the industry to address the aforementioned deficiencies and inadequacies.

SUMMARY

Embodiments of the present disclosure provide a system for improving automobile safety, comprising: an intoxicating substance sensor for detecting the presence of intoxicating substances in a potential driver; a time delay switch communicatively coupled to the intoxicating substance sensor, wherein a delay signal is activated when the intoxicating substance sensor detects the presence of an intoxicating substance; an interface, for electrically coupling the time delay switch of an automotive ignition system, wherein the automotive ignition system is disabled while the delay signal is activated; and a reset switch, electrically coupled to the time delay switch, wherein the reset switch deactivates the delay signal such that the automotive ignition system is not disabled.

Embodiments of the present disclosure can also be viewed as providing methods of an automotive safety system, comprising the steps of: collecting data from the proximity of a potential driver, wherein the data is collected through a sensor; analyzing the data for the presence of intoxicating substances; determining whether the potential driver is under the influence of intoxicating substances; and disabling an automotive ignition system if the potential driver is determined to be under the influence of intoxicating substances.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

Figure 1:
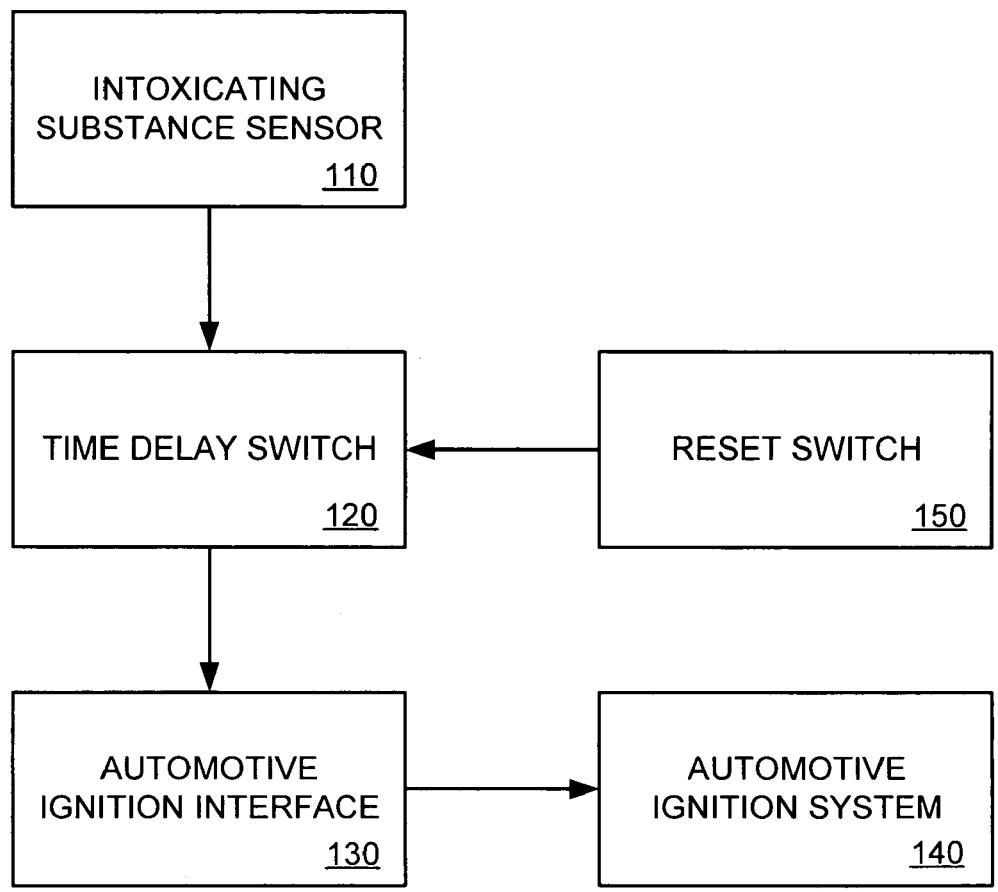
FIG. 1 illustrates a block diagram of an embodiment of a system as disclosed herein.

Reference is now made to FIG. 1, which illustrates a block diagram of an embodiment of a system as disclosed herein. An intoxicating substance sensor 110 is provided for detecting the presence of an intoxicating substance on a potential automobile driver. In an embodiment, the sensor may be configured to perform a scanning, sampling or sensing function at specific time intervals, such as, for example, once every two seconds. Alternatively, the sensor may be configured to perform the scanning, sampling or sensing operation as a trigger to specific events, such as, for example, the opening of a door, the insertion of a key into the ignition switch, or a change in the electrical current being drawn from the automobile electrical system.

The intoxicating substance sensor 110 is electrically coupled to a time delay switch 120 for initiating a time delay function when an intoxicating substance is detected by the intoxicating substance sensor. An embodiment of the time delay function provides for the generation of a signal voltage for a specific predetermined period of time after the time delay function is initiated. For example, the time delay signal may be generated for one hour after the time delay function is initiated by the intoxicating substance sensor 110.

The time delay switch 120 is communicatively coupled to an automotive ignition interface 130. In an embodiment, communicative coupling between the time delay switch 120 and the automotive ignition interface 130 may be in the form of a conductive electrical connection. Alternatively, the devices may be coupled inductively, optically or through the use of radio frequency wireless technology.

The automotive ignition interface 130 is in communication with the automotive ignition system 140 and serves to disable the automotive ignition system for the duration of the time delay signal. In one embodiment, the automotive ignition interface 130 provides an electrical interrupt, such as in the form of an open electrical contact in the automotive ignition system. Alternative embodiments may provide a signal level interrupt to a processor or other supervisory control unit, which consequently disables the automotive ignition system 140.

Additionally, a reset switch 150 is provided to discontinue the time delay signal. In an embodiment, the reset switch 150 is electrically coupled to the time delay switch 120. The reset switch 150 may be located or configured to prevent an intoxicated driver from resetting the system and thus operating the automobile. For example, the reset switch 150 may be located in an area requiring specific tools or keys to access.

Figure 2:
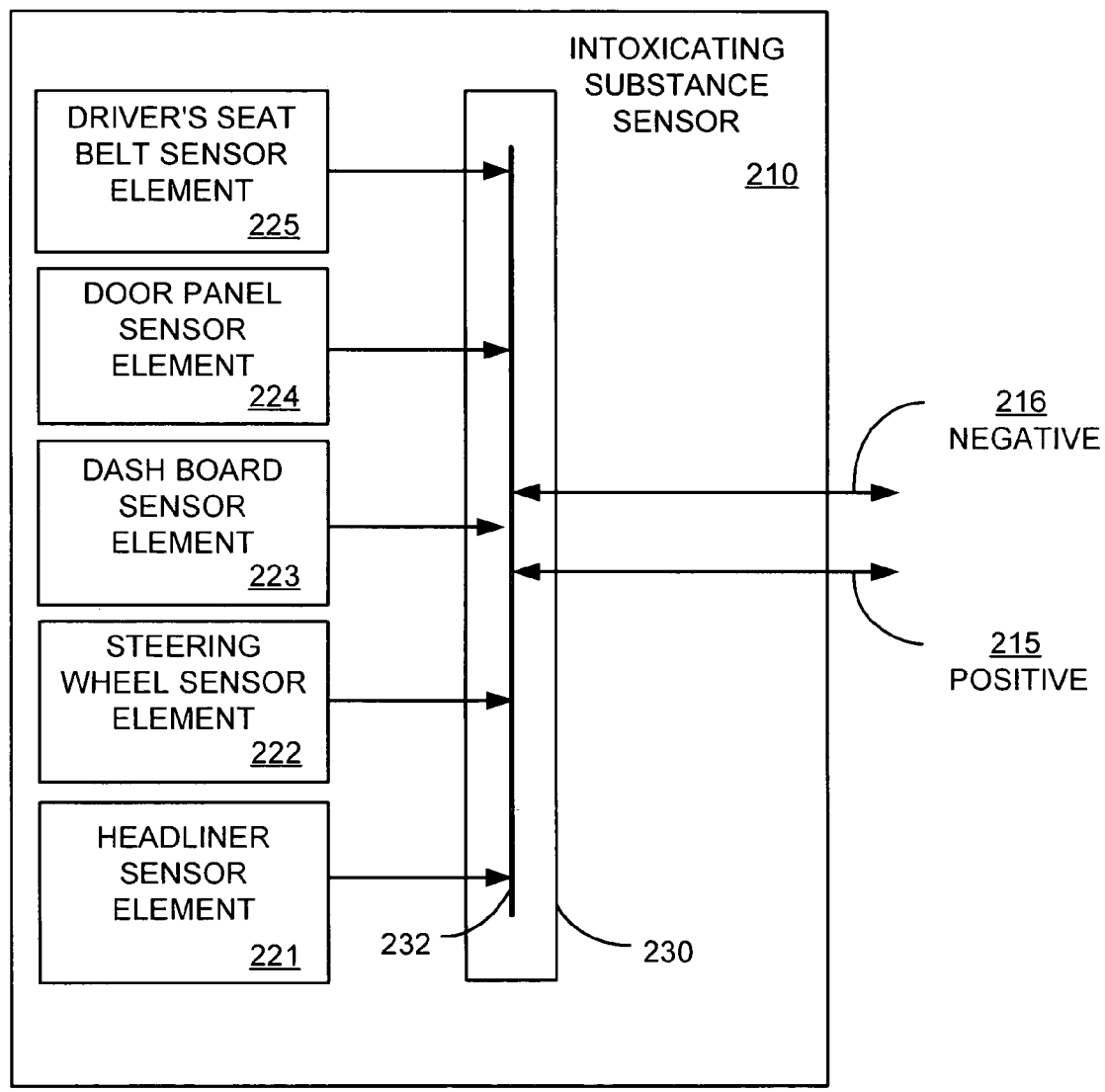
FIG. 2 is a block diagram illustrating an embodiment of an intoxicating substance sensor under the systems and methods disclosed herein.

Reference is now made to FIG. 2, which is a block diagram illustrating an embodiment of an intoxicating substance sensor under the systems and methods disclosed herein. The intoxicating substance sensor 210 contains a sensor signal consolidation unit 230 which, in this embodiment, has a common electrical bus 232 configured to contain positive and negative voltage bus components. The common electrical bus 232 provides a positive voltage external connection 215 and a negative voltage external connection 216. The intoxicating substance sensor 210 provides for sensor element locations at multiple locations in the passenger compartment in order to provide a reliable and timely signal that a potential driver is intoxicated. The sensor elements can be located in the driver seat belt 225, the driver door panel 224, the front dash board 223, the steering wheel 222 and the headliner above the driver 221. Although the sensor elements 221–225 of this embodiment are illustrated as configured to provide, for example, a closed contact across the two bus components to signal the presence of an intoxicating substance, one of ordinary skill in the art knows or will know that the systems and methods disclosed herein could utilize signal level analog, signal level digital, inductively coupled, optically coupled or radio frequency wireless coupled communication between the sensor elements 221–225 and the sensor signal consolidation unit 230. Similarly, the above listed methods could also be utilized in the communication between the intoxicating sensor 210 and other components under these systems and methods.

Figure 3:
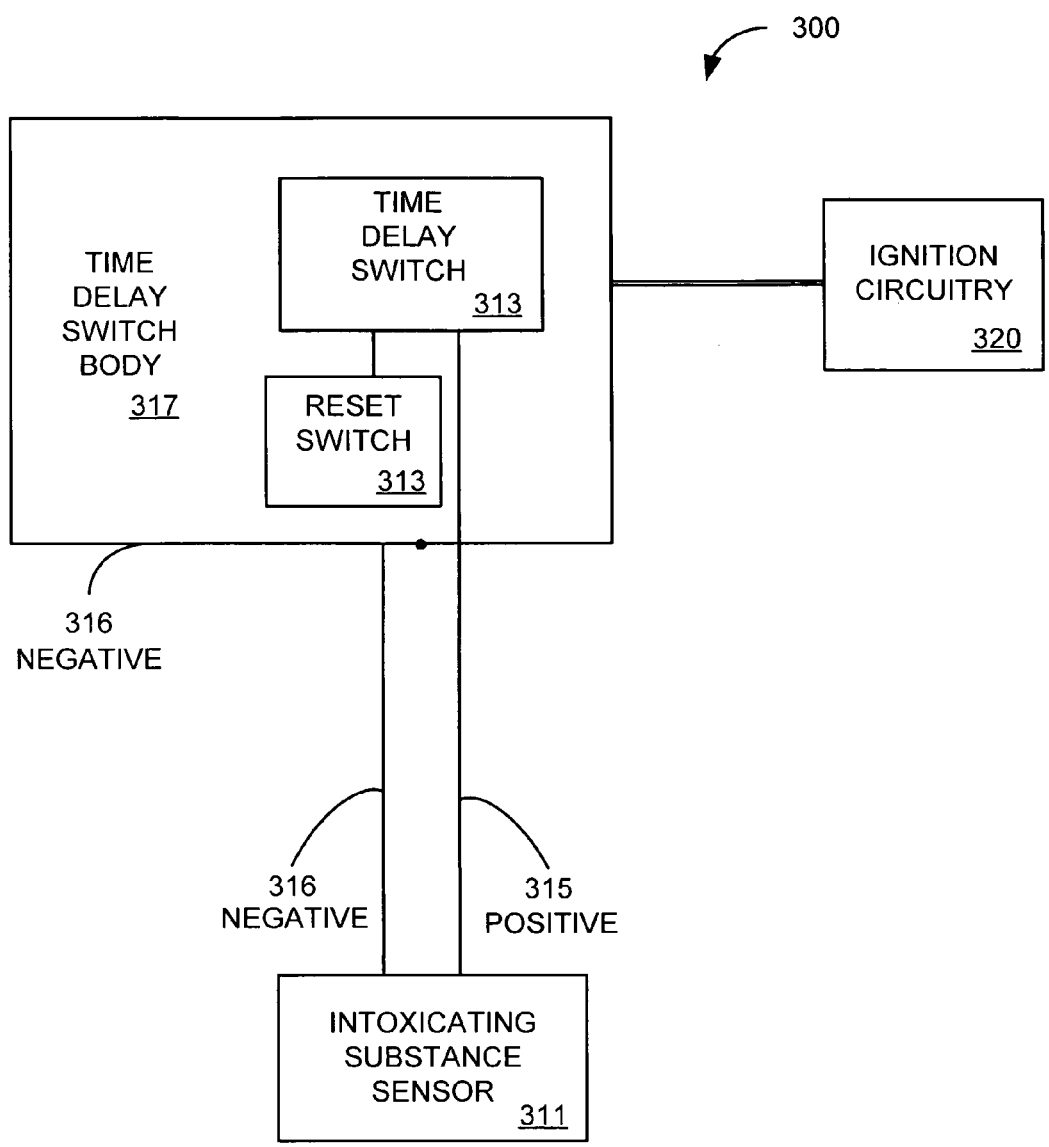
FIG. 3 is a block diagram illustrating a simplified circuit of an embodiment of the systems and methods herein.

Reference is now made to FIG. 3, which is a block diagram illustrating a simplified circuit of an embodiment of the systems and methods herein. The system 300 comprises an intoxicating substance sensor 311 which has a negative voltage level conductor 316 electrically coupled to a time delay switch body 317 and a positive voltage level conductor 315 electrically coupled to a time delay switch 313. A reset switch 314 is also coupled to the time delay switch 313. The time delay switch is electrically coupled to ignition circuitry 320 of, for example, an automobile.

The operation of this circuit commences when the intoxicating substance sensor 311 detects the presence of intoxicating substances proximate to a potential driver. The intoxicating substance sensor provides a positive voltage level 315 to the time delay switch 313. The time delay switch 313 subsequently provides a time delay signal to the ignition circuitry 320 for a predetermined period of time, causing the ignition circuitry 320 to disable the ignition for the duration of the time delay. One of ordinary skill in the art knows or will know that consistent with the systems and methods disclosed herein, the time delay signal can be in the form of an open or closed contact, a line or signal level voltage either conducted or transmitted inductively, an optical signal or a wireless radio frequency signal to an ignition interface.

The reset switch 314 serves to remove the time delay signal transmitted to the ignition circuitry 320 and thus restore the functionality of the ignition system. The countdown or delay timer value corresponding to the predetermined period of time is also reset to its initial value.

Figure 4:
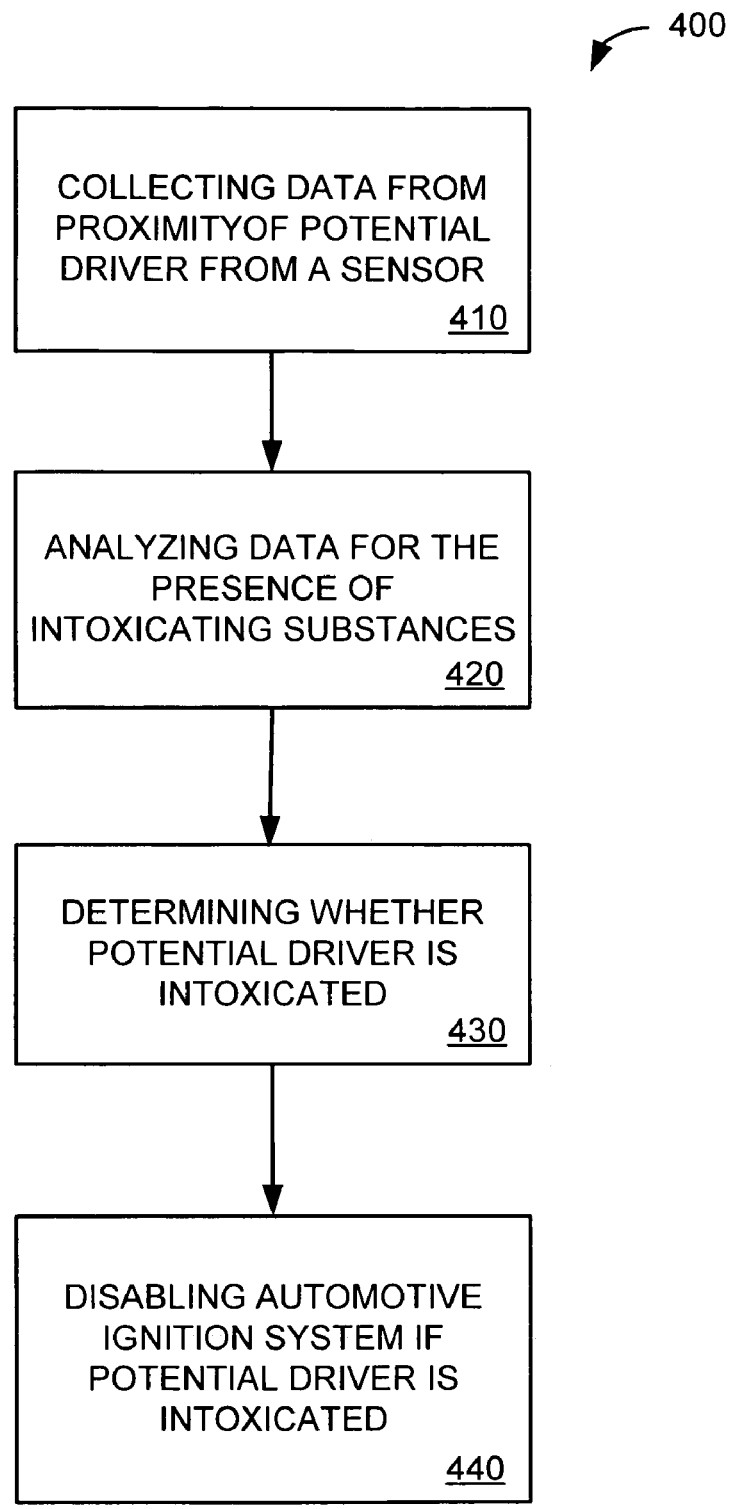
FIG. 4 is a block diagram illustrating an embodiment of a method disclosed herein.

Reference is now made to FIG. 4, which is a block diagram illustrating an embodiment of a method disclosed herein. The method 400 first collects data from a sensor, which is proximate to a potential driver 410. The sensor may provide for data collection from multiple locations proximate to a potential driver including the driver's safety restraint, the automobile headliner, the steering wheel, the dash board or instrument cluster and the driver's door panel. The data is then analyzed for the presence of intoxicating substances, indicators, or derivatives 420. Based on the results of the data analysis, a determination is made as to whether the potential driver is intoxicated 430. If the driver is determined to be intoxicated, the automotive ignition system is disabled for a predetermined period of time 440.

Figure 5:
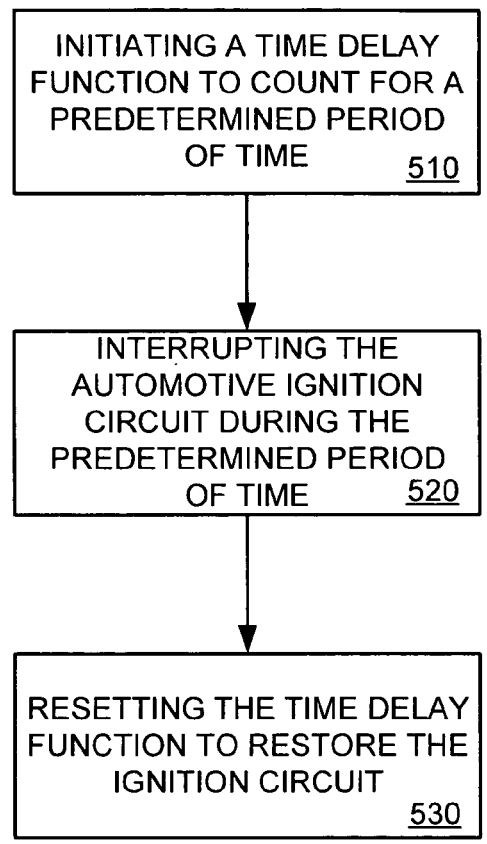
FIG. 5 is a block diagram illustrating an embodiment of a response to the presence of an intoxicating substance.

Brief reference is made to FIG. 5, which is a block diagram illustrating an embodiment of a response to the presence of an intoxicating substance. When the presence of an intoxicating substance is signaled, a time delay function is initiated to provide a time delay signal for a predetermined period of time 510. The time delay signal functions to interrupt the automotive ignition circuit during the predetermined period of time 520. When actuated, a resetting input restores the time delay to its initial value and restores the functionality of the ignition circuit 530.

Figure 6:
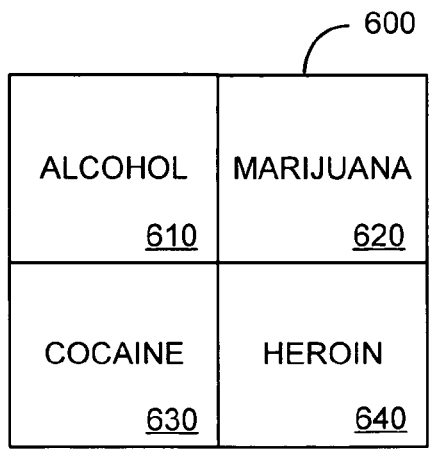
FIG. 6 is a simplified block diagram of an exemplary sensor array used in an embodiment of the systems and methods herein.

Reference is now made to FIG. 6, which is a simplified block diagram of an exemplary sensor array used in an embodiment of the systems and methods herein. The sensor array 600 includes, for example, distinct substance detection technologies, which may be employed in each sensor element. For example, under this embodiment, the sensor array includes a detection technology for alcohol 610, marijuana 620, cocaine 630 and heroin 640. Although certain embodiments are presented as utilizing samples of air proximate to the potential driver, alternative embodiments may utilize sensors receiving other types of data inputs including but not limited to skin conductivity, bio-electrical impulses, temperature and perspiration chemical content to detect the presence of intoxicating substances.

Further, one of ordinary skill in the art knows or will know that although the systems and methods herein are presented in the context of an automotive environment, these concepts are applicable to the operation of any vehicle or device, which, if used by an impaired operator, could result in serious bodily injury or death to the user or others.

Any process descriptions or blocks in flow charts should be understood as representing modules, segments, or portions of code which include one or more executable instructions for implementing specific logical functions or steps in the process, and alternate implementations are included within the scope of the illustrated embodiment of the present disclosure in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure, particularly, any illustrated embodiments, are merely possible examples of implementations, merely set forth for a clear understanding of the principles of the disclosure. Many variations and modifications may be made to the above-described embodiment(s) of the disclosure without departing substantially from the spirit and Therefore, having thus described the disclosure, at least the following is claimed:

1. A system for improving automobile safety, comprising:
   a plurality of intoxicating substance sensors for detecting the presence of intoxicating substances in a potential driver, the plurality of intoxicating substance sensors comprising a sensor array, wherein the intoxicating substance sensors are configured to detect a plurality of respective distinct intoxicating substances;
   a time delay switch communicatively coupled to at least one of the intoxicating substance sensors, wherein a delay signal is activated when the at least one of the intoxicating substance sensors detects the presence of an intoxicating substance;
   an interface, for electrically coupling the time delay switch and an automotive ignition system, wherein the automotive ignition system is disabled while the delay signal is activated; and
   a reset switch, electrically coupled to the time delay switch, wherein the reset switch deactivates the delay signal such that the automotive ignition system is not disabled.

2. The system of claim 1, wherein the at least one of the intoxicating substance sensors detects the presence of intoxicating substances through vapor sampling.

3. The system of claim 1, wherein the at least one of the intoxicating substance sensors detects the presence of intoxicating substances through skin contact.

4. The system of claim 1, wherein the at least one of the intoxicating substance sensors detects the presence of alcohol.

5. The system of claim 1, wherein the at least one of the intoxicating substance sensors the presence of marijuana.

6. The system of claim 1, wherein the at least one of the intoxicating substance sensors detects the presence of cocaine derived substances.

7. The system of claim 1, wherein the at least one of the intoxicating substance sensors detects the presence of opium derived substances.

8. The system of claim 1, wherein the at least one of the intoxicating substance sensors is located in the headliner of the passenger compartment.

9. The system of claim 1, wherein the at least one of the intoxicating substance sensors is located in the front instrument panel.

10. The system of claim 1, wherein the at least one of the intoxicating substance sensors is located in the driver door panel.

11. The system of claim 1, wherein the at least one of the intoxicating substance sensors is located in the driver safety restraint.

12. A method for providing an automotive safety system, comprising the steps of:
   collecting data from the proximity of a potential driver, wherein the data is collected through a plurality of intoxicating substance sensors for detecting the presence of intoxicating substances in the potential driver, the plurality of intoxicating substance sensors comprising a sensor array, the intoxicating substance sensors being configured to detect a plurality of respective distinct intoxicating substances;
   analyzing the data for the presence of at least one of the plurality of distinct intoxicating substances;
   determining whether the potential driver is under the influence of the at least one of the plurality of distinct intoxicating substances; and
   disabling an automotive ignition system if the potential driver is determined to be under the influence of the at least one of the plurality of distinct intoxicating substances.

13. The method of claim 12, the collecting step comprising sampling the air surrounding the potential driver.

14. The method of claim 12, the collecting step further comprising measuring skin biological signals through skin contact.

15. The method of claim 12, the disabling step comprising:
   initiating a time delay function, such that the time delay function counts for a predetermined period of time;
   interrupting the ignition circuit during the predetermined period of time, corresponding to the time delay function; and
   resetting the time delay function, such that the ignition circuit is restored to an uninterrupted state.

16. The method of claim 12, wherein the plurality of intoxicating substance sensors are positioned at locations selected from the group consisting of: a vehicle headliner, a driver door panel, a steering wheel, and a driver safety restraint.

17. A system comprising:
   means for collecting data from the proximity of a potential driver, wherein the data is collected through a plurality of intoxicating substance sensors for detecting the presence of intoxicating substances in the potential driver, the plurality of intoxicating substance sensors comprising a sensor array, the intoxicating substance sensors being configured to detect a plurality of respective distinct intoxicating substances;
   means for analyzing the data for the presence of at least one of the plurality of distinct intoxicating substances;
   means for determining whether the potential driver is under the influence of the at least one of the plurality of distinct intoxicating substances; and
   means for disabling an automotive ignition system if the potential driver is determined to be under the influence of the at least one of the plurality of distinct intoxicating substances.

* * * * *